United States Patent [19]

Farago

[11] 4,338,022

[45] Jul. 6, 1982

[54] MULTIPLE MAGNIFICATION OPTICAL ASSEMBLY

[75] Inventor: Laszlo D. Farago, Afton, Minn.

[73] Assignee: Minnesota Mining and Manufacturing Company, St. Paul, Minn.

[21] Appl. No.: 218,846

[22] Filed: Dec. 22, 1980

[51] Int. Cl.[3] ........................ G03B 27/50; G03B 27/70

[52] U.S. Cl. ........................................... 355/60; 355/8

[58] Field of Search .................... 355/8, 11, 49, 51, 57, 355/65, 66, 60

[56] References Cited

U.S. PATENT DOCUMENTS

| | | | |
|---|---|---|---|
| 3,543,289 | 11/1970 | Koizumi | 355/57 |
| 3,837,743 | 9/1974 | Amemiya | 355/66 |
| 4,029,409 | 6/1977 | Spinelli et al. | 355/51 |
| 4,084,897 | 4/1978 | Queener | 355/8 |
| 4,105,326 | 8/1978 | Mochimaru | 355/60 |
| 4,118,118 | 10/1978 | Barto | 355/8 |
| 4,232,960 | 11/1980 | Glab | 355/66 |

*Primary Examiner*—L. T. Hix
*Assistant Examiner*—Alan Mathews
*Attorney, Agent, or Firm*—Cruzan Alexander; Donald M. Sell; Randall J. Gort

[57] ABSTRACT

A variable magnification optical assembly having a housing with a fixed location for its object and image windows, and a carriage which is linearly moveable within the housing and which has mounted thereon at least one mirror. The carriage mirror(s) cooperates with at least one mirror affixed on the housing to define a first and a second light path within the optical assembly; with the respective paths being dependent upon the position of the carriage within the housing. The various mirrors are positioned within the optical assembly such that the light paths have different conjugate ratios. Therefore, a change in the magnification obtained within the assembly is accomplished with only a linear displacement of the carriage.

4 Claims, 4 Drawing Figures

MULTIPLE MAGNIFICATION OPTICAL ASSEMBLY

BACKGROUND OF THE INVENTION

This invention relates to variable magnification optical assemblies used in scanning, electrographic type reproduction devices, in which assemblies a change in magnification is accomplished by repositioning half lenses or reflex lenses (called reflex lenses herein) so as to change the conjugate distances and thereby the magnifications for the assemblies.

Many optical assemblies are known for use in scanning type electrographic reproduction devices in which the magnification produced by the assembly between an image window and an object window can be changed. Generally the magnification produced by these assemblies is changed either by changing the focal length of a lens included in the assembly (e.g., by adding lens elements) or by changing the position of optical elements (typically mirrors and a lens within the assembly) to produce different paths through the device for light reflected from the document (called light paths herein), which different light paths have portions of different lengths (or different conjugate distances) between the object window and the lens and between the lens and the image window. The addition of lens elements avoids some potentially complex optical alignment problems, but is a relatively expensive approach. Assemblies for providing different light paths with different conjugate distances are usually less expensive but can be prone to alignment difficulties, particularly where reflex lenses are utilized to further reduce cost of the optical assembly. A reflex lens has a reflective surface on one side that is normal to its axis of the lens. The reflex lens must receive light traveling along a light path through the assembly at some angle to its axis (since light received along the axis of the lens would also be reflected back along the axis), and will reflect that received light back through the lens at an angle with respect to the incident light that is bisected by the axis of the lens. These angles of incidence and reflection must be taken into account when the lens is moved into different positions to ensure that the reflex lens will receive and reflect light in proper alignment with the other optical components defining the two light paths through the assembly.

U.S. Pat. No. 4,029,409 describes an optical assembly in which the magnification produced by the assembly between a fixed image window and a fixed object window on a housing for the assembly can be changed by changing the position of a reflex lens so that the reflex lens and cooperating mirrors in the assembly will provide two different light paths with different conjugate distances through the assembly between the windows. The reflex lens described in that patent, however, does not reflect light in the same direction along a common portion of the light paths toward the image window, and the two portions of the two light paths which are incident on the reflex lens at its two different positions are not parallel. Thus not only must the reflex lens be moved between its two positions, but it must also be pivoted so that it will properly align with the other elements defining the two light paths in each of its positions. Such pivoting of the lens must be precise, and such precise pivoting of the lens is difficult and costly to achieve and to maintain during the lifetime of the optical assembly.

U.S. Pat. No. 4,084,897 describes an optical assembly in which the magnification produced by the assembly between an image window and a fixed object window on a housing for the assembly can be changed by movement of a reflex lens so that the reflex lens and cooperating mirrors in the assembly will provide two different light paths with different conjugate distances through the assembly between the windows. In each of its positions the reflex lens reflects light in the same direction along a common portion of the light paths toward the object window and the two portions of the two light paths which are incident on the reflex lens at its two different positions are parallel. Thus the carriage need only be moved in a linear motion along the optical path of light reflected from the reflex lens and need not be pivoted as it is moved between its two positions, thus affording an optical assembly which is easier to align and maintain in alignment than the optical assembly described in U.S. Pat. No. 4,084,097. In the optical assembly described in U.S. Pat. No. 4,084,897, however, the parallel path portions for light incident on the reflex lens in its two positions are provided by changing the location of the object window, which change complicates both the illumination mechanism for the assembly and the mechanism for orienting an object to be copied with respect to the object window.

SUMMARY OF THE INVENTION

The present invention provides an optical assembly for use in scanning type electrographic copying machines, which assembly, like the prior art assemblies described above, utilizes a movable reflex lens and cooperating mirrors to change the magnification produced by the assembly; but in which assembly the object and image windows are both fixed within a housing, the reflex lens is fixed to a carriage mounted on the housing for linear movement, and the cooperating mirrors are fixed either to the housing or to the carriage to provide a simple, inexpensive assembly that is easy to align, and maintain in alignment during usage of the assembly, and with which variable magnification is accomplished by a simple linear displacement of the carriage with respect to the housing.

According to the present invention there is provided a variable magnification optical assembly for use in a scanning type reproduction device, which assembly comprises a housing member having a fixed object window and a fixed image window; a carriage member; means mounting the members for relative linear movement in a first direction between first and second relative positions; and light path means for defining a first light path between the windows when the members are in their first relative position, and for defining a second light path between the windows when the members are in their second relative position, which light paths have different magnification ratios and have a common light path portion. The light path means comprises a reflex lens or half lens reflector fixed on the carriage member and positioned to receive and reflect light along the common light path portion in both of said relative positions, and a plurality of mirrors comprising a first mirror mounted on the carriage, and a second mirror mounted on the housing; the first mirror being spaced from the first light path when the members are in their first relative position, and intercepting the first light path to direct light along the second light path via the second mirror when the members are in their second relative position.

In one embodiment of the optical assembly the mirrors further include a third mirror fixed on the carriage member in a position such that when the members are in their first relative position the third mirror receives light directly from the fixed object window and reflects that received light directly toward the half lens reflector, and when the members are in their second relative position the first mirror receives light directly from the fixed object window and directs that received light to the half lens reflector sequentially via the second mirror and the third mirror; whereas in another embodiment of the optical assembly the mirrors further include third and fourth mirrors fixed on the housing member such that when the members are in their first relative position, the third mirror receives light directly from the fixed object window and reflects that received light directly toward the half lens reflector, and when the members are in their second relative position the first mirror receives light directly from the fixed object window and reflects that received light to the half lens reflector sequentially via the second and fourth mirrors; and in yet another embodiment of the optical assembly the mirrors further include a third mirror fixed on the housing member in a position such that when the members are in their first relative position the third mirror receives light directly from the fixed object window and reflects the received light directly toward the half lens reflector, and when the members are in their second relative position, the first mirror receives light directly from the third mirror and directs that received light to the half lens reflector via the second mirror.

BRIEF DESCRIPTION OF THE DRAWING

The present invention will be further described hereinafter with reference to the accompanying drawing wherein like numbers refer to like parts in the several views, and wherein.

DESCRIPTION OF THE EMBODIMENT

Figure 1:
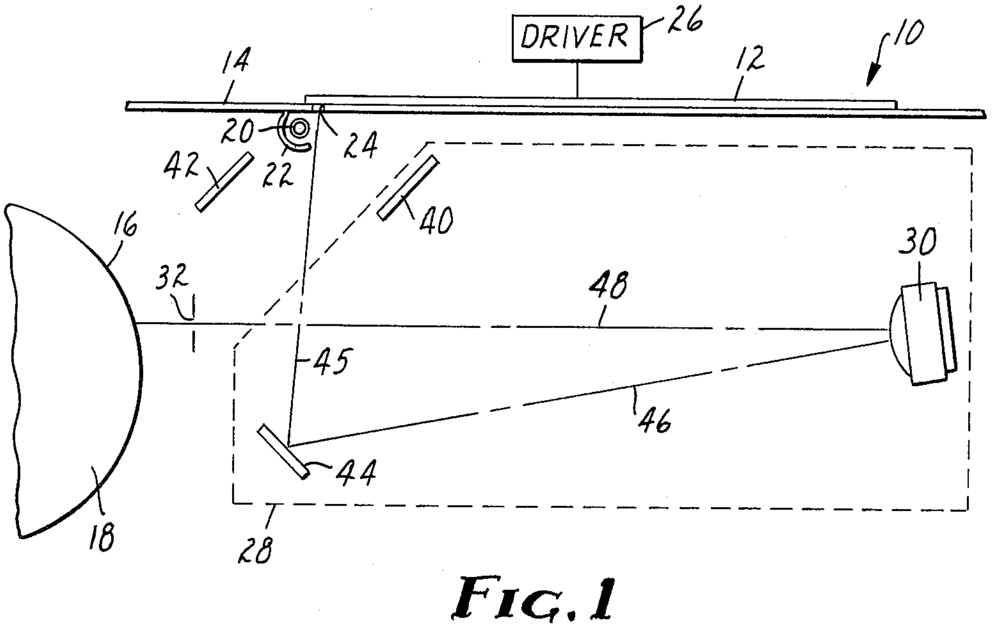
FIG. 1 is a schematic representation of a first embodiment of a multiple magnification optical assembly according to the present invention showing members of the optical assembly in a first relative position to provide a first magnification ratio.
Figure 2:
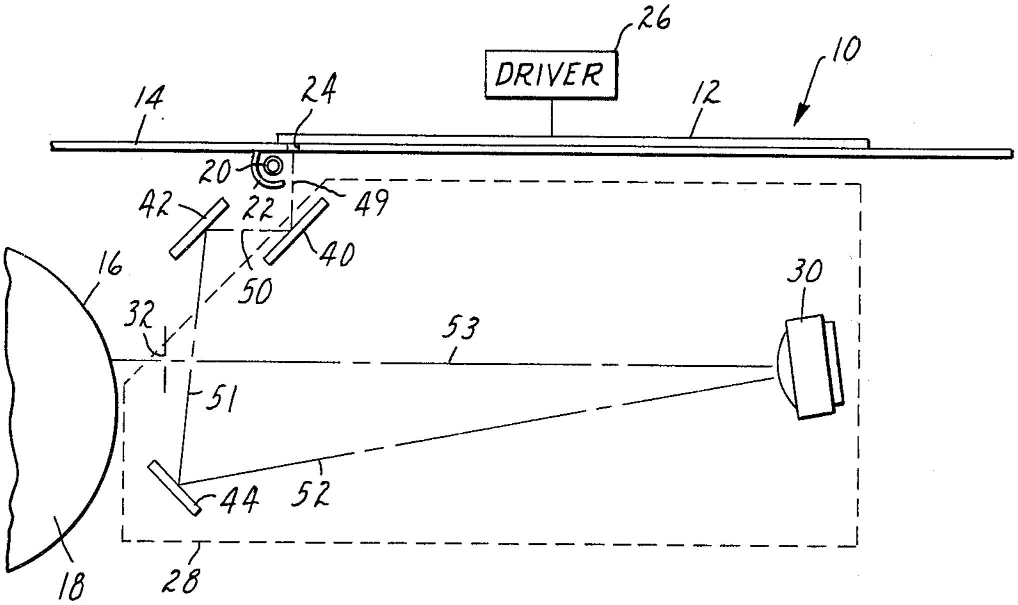
FIG. 2 is a schematic representation of the optical assembly shown in FIG. 1 but showing the members of the optical assembly in a second relative position to provide a second magnification ratio.

Referring now to FIGS. 1 and 2 of the drawing there is schematically shown a first embodiment of a multiple magnification optical assembly according to the present invention generally designated by the reference numeral 10. The assembly 10 is of the type useful in a scanning type electrographic reproduction device in that it is adapted to sequentially project a light image of an object (not shown), supported on a transparent platen 12 which is moved along a housing member or housing 14 of the assembly 10, onto the surface 16 of a rotating photo receptor drum 18, so that a copy of the object may be made. A stationary tungsten lamp 20 and reflector 22 are fixed on the housing 14 and direct light through a narrow fixed object window 24 in the housing 14 across a portion of an object on the platen 12. A driver assembly 26 of a conventional type is adapted to move the platen 12 (and thereby an object on the platen 12) across the object window 24 at a constant speed so as to successively illuminate narrow areas of the object. Images of the successively illuminated areas are reflected along one of two light paths (one of which is illustrated in FIG. 1 and the other in FIG. 2) provided by light path means on the device and selected by movement of a carriage member 28 carrying a portion of the light path means including a reflex lens 30 along a linear path between a first position (FIG. 1) and a second position (FIG. 2). Both light path means project the images through a fixed image window 32 on the housing 14 and onto the surface 16 of the drum 18 which is a photoreceptor and from which a copy of the image may be formed by known mechanisms (not shown).

The two light paths provided have different conjugate ratios (i.e., have different ratios of the lengths between (1) an object on the platen 12 and the reflex lens 30 and between (2) the reflex lens 30 and the surface 16 of the drum 18). These different conjugate ratios coupled with the focal length of the reflex lens 30 provide different magnification ratios for the image. Means (not shown) are provided for rotating the drum 18 at a surface speed with respect to the speed of the platen 12 that is directly proportional to the conjugate ratio so that the image will be properly received on the surface 16 of the drum 18.

The means for defining the light paths include the reflex lens 30 which is fixed on the carriage 28 with its axis inclined at an acute angle with respect to the direction of movement of the carriage 28 with respect to the housing 14 and movable with the carriage 28 between its first and second positions (FIGS. 1 and 2 respectively); and first, second and third mirrors 40, 42, and 44 respectively. The first and third mirrors 40 and 44 are fixed on the carriage 28 with the third mirror 44 positioned when the carriage 28 is in its first position so that it will reflect light received directly from the object window 24 along a light path portion 45 directly to the reflex lens 30 along a light path portion 46 which intersects the reflex lens 30 at an angle with respect to the axis of the lens 30 that is equal to the angle between the direction of movement of the carriage 28 and the axis of the lens 30 but is on the opposite side of the axis of the lens 30. Thus the reflex lens 30 will reflect that light along a light path portion 48 parallel with the direction of movement of the carriage 28 and through the image window 32 onto the surface 16 of the drum 18. When the carriage 28 is in its first position (FIG. 1) the first mirror 40 is spaced from the first light path in a position where it will not receive light or reflect light to any other of the mirrors. Upon movement of the carriage 28 to its second position (FIG. 2), however, the first mirror 40 will be positioned by the carriage 28 to reflect light received directly from the object window 24 along light path portions 49 and 50 to the second mirror 42 fixed on the housing 14, which second mirror 42 will reflect the light along a light path portion 51 to the third mirror 44 which has moved with the carriage 28 to a new position at which the third mirror 44 will reflect the light along a path portion 52 parallel to and spaced from the path portion 46 of the first light path so that the light will intersect the reflex lens 30 at the same angle to its axis and will be reflected along a path portion 53 that is common to a portion of the path portion 48 of the first light path toward and through the image window 32. In the second light path the effective distance between the object window 24 and the reflex lens 30 has been increased by the distance between the first and second mirrors 40 and 42, and the distance from the reflex lens 30 to the surface 16 of the drum 18 has been decreased. The strictly linear displacement of the carriage 28 has therefore resulted in an increase of the object distance and a decrease of the image distance thereby decreasing the conjugate ratio, and causing the magnification obtained within the assembly 10 when the carriage 28 is in its second position to be less than that of the assembly 10 when the carriage 28 is in its first position.

Figure 3:
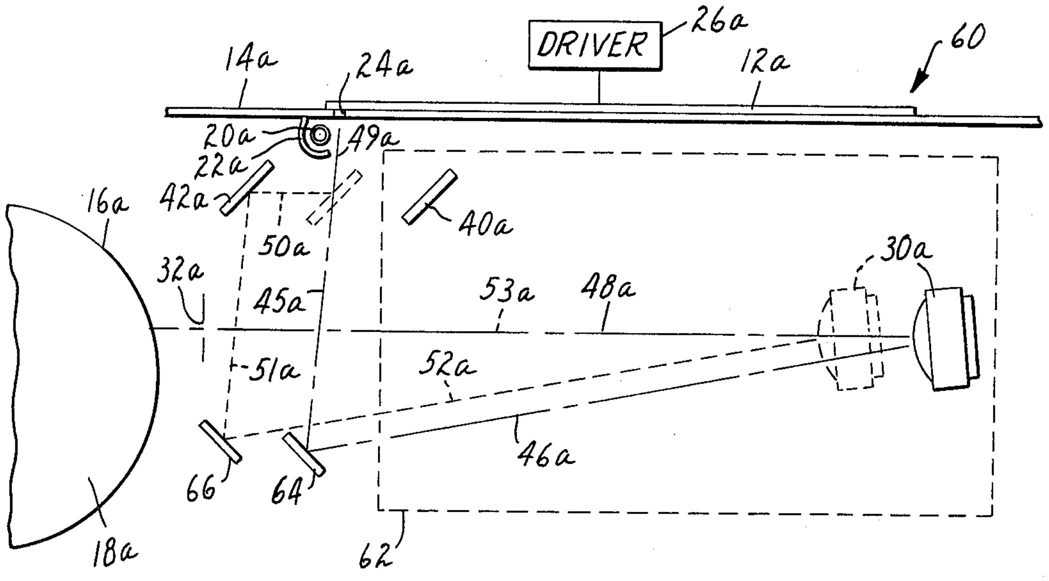
FIGS. 3, and 4 are schematic representations of second, third and fourth embodiments of optical assemblies according to the present invention, each of which figures illustrates in solid outline a first relative position for members of the assembly which provides a first magnification ratio for the assembly, and by showing one of the members in dotted outline illustrates a second relative position for members of the assembly which provides a second magnification ratio for the assembly.

Referring now to FIG. 3 of the drawing there is schematically shown a second embodiment of a multiple magnification optical assembly according to the present invention generally designated by the reference numeral 60. The optical assembly 60 incorporates several parts that are essentially the same as parts of the assembly 10, and produces the same light path portions as the assembly 10 and those same parts and light part portions have been given the same reference numerals except for the addition of the suffix "a".

Like the assembly 10, the assembly 60 is adapted to sequentially project an image of an object (not shown) supported on a transparent platen **12*a* moved along a housing member or housing 14*a* for the assembly 60 onto the surface 16*a* of a rotating photoreceptor drum 18*a* so that a copy of the object may be made. A stationary lamp 20*a* and reflector 22*a* are fixed on the housing 14*a* and direct light through a narrow fixed object window 24*a* in the housing 14*a* across a portion of an object on the platen 12*a*. A driver assembly 26*a* is adapted to move the platen 12*a* (and thereby an object on the platen 12*a*) across the object window 24*a* at a constant speed so as to successively illuminate narrow areas of the object. Images of the successively illuminated areas are reflected along one of two light paths of different conjugate distances both illustrated in FIG. 3) provided by light path means on the device and selected by movement of a carriage member 62 carrying a portion of the light path means including a reflex lens 30*a* along a linear path between a first position shown in solid outline and a second position shown in dotted outline. Both light path means project the light through a fixed image window 32*a* on the housing 14*a* and onto the rotating photoreceptor surface 16*a* of the drum 18*a***.

Also, like the assembly 10, in addition to the reflex lens **30*a* fixed on the carriage 62 with its axis inclined at an acute angle with respect to the direction of movement of the carriage 62 for movement with the carriage 62 between its first and second positions, the means for defining the light paths in the assembly 60 includes the first and second mirrors 40*a* and 42*a* attached to the carriage 62 and housing 14*a* respectively. Unlike the assembly 10, however, the assembly 60 uses third and fourth mirrors 64 and 66, both of which are fixed to the housing 14*a* to complete the light path means. The third mirror 64 is positioned so that when the carriage 62 is in its first position the third mirror 64 will receive light directly from the object window 24*a* along a light path portion 45*a* and reflect the light directly to the reflex lens 30*a* along a light path portion 46*a* which intersects the reflex lens 30*a* at an angle with respect to the axis of the lens 30*a* so that the reflex lens 30*a* will reflect that light along a light path portion 48*a* parallel with the direction of movement of the carriage 62 and through the image window 32*a* onto the surface 16*a* of the drum 18*a*. When the carriage 62 is in its first position (FIG. 1) the first mirror 40*a* is spaced from the first light path in a position where it will not receive light or reflect light to any other of the mirrors. Upon movement of the carriage 62 to its second position, however, the first mirror 40*a* will be positioned by the carriage 62 to reflect light received directly from the object window 24*a* along a light path portion 49*a* and 50*a* to the second mirror 42*a* fixed on the housing 14, which second mirror 42*a* will reflect the light along a light path portion 51*a* to the fourth mirror 66 which is fixed on the housing 14*a* in a position to reflect the light along a path portion 52*a* parallel to and spaced from the path portion 46*a* of the first light path so that the light will intersect the reflex lens 30*a* at the same angle to its axis and will be reflected along a path portion 53*a* that is common to a portion of the path portion 48*a* of the first light path toward and through the image window 32*a***.

Figure 4:
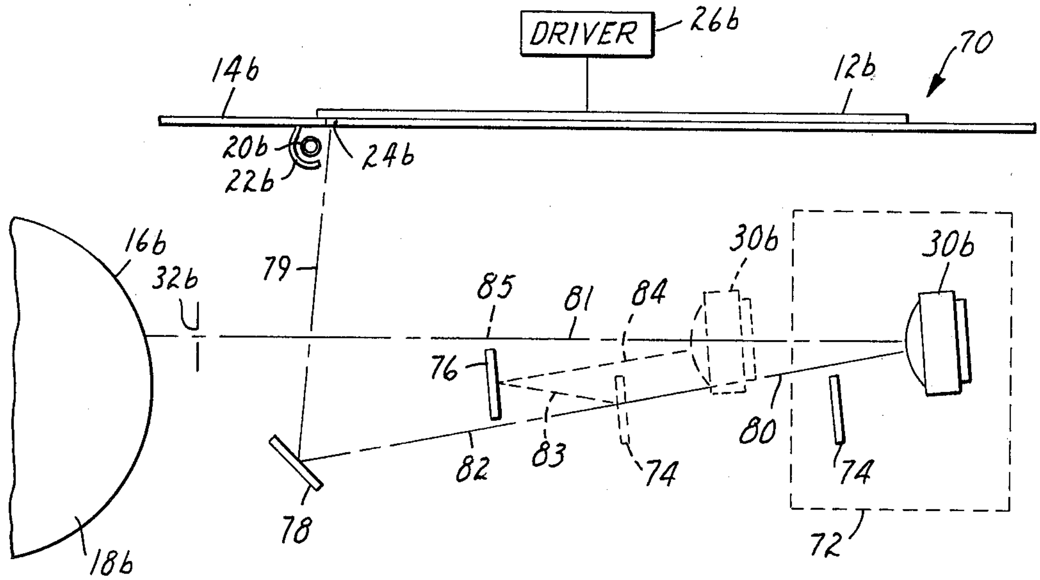

Referring now to FIG. 4 of the drawing there is schematically shown a third embodiment of a multiple magnification optical assembly according to the present invention generally designated by the reference numeral 70. The optical assembly 70 incorporates several parts that are essentially the same as parts of the assembly 10, which same parts have been given the same reference numerals except for the addition of the suffix "b".

Like the assembly 10, the assembly 70 is adapted to sequentially project an image of an object (not shown) supported on a transparent platen **12*b* moved along a housing member or housing 14*b* for the assembly 70 onto the surface 16*b* of a rotating photoreceptor drum 18*b* so that a copy of the object may be made. A stationary lamp 20*b* and a reflector 22*b* are fixed on the housing 14*b* and direct light through a narrow fixed object window 24*b* in the housing 14*b* across a portion of an object on the platen 12*b*. A driver assembly 26*b* is adapted to move the platen 12*b* (and thereby an object on the platen 12*b*) across the object window 24*b* at a constant speed so as to successively illuminate narrow areas of the object. Images of the successively illuminated areas are reflected along one of two light paths of different conjugate distances both illustrated in FIG. 4) provided by light path means on the device and selected by movement of a carriage member 72 carrying a portion of the light path means including a reflex lens 30*b* along a linear path between a first position shown in solid outline and a second position shown in dotted outline. Both light path means project the images through a fixed image window 32*b* on the housing 14*b* and onto the rotating photoreceptor surface 16*b* of the drum 18*b***.

In addition to the reflex lens **30*b* fixed on the carriage 72 with its axis inclined at an acute angle with respect to the direction of movement of the carriage 72 for movement with the carriage 72 between its first and second positions, the means for defining the light paths in the assembly 70 includes first and second mirrors 74 and 76 attached to the carriage 72 and housing 14*b* respectively, and a third mirror 78 fixed to the housing 14*b* to complete the light path means. The third mirror 78 is positioned so that when the carriage 72 is in either its first or its second position the third mirror 78 will receive light directly from the object window 24*b* along a light path portion 79. When the carriage 72 is in its first position, that light will be reflected along a path portion 80 directly to the reflex lens 30***b* at an angle with respect to the axis of the lens 30*b* so that the reflex lens 30*b* will reflect that light along a path portion 81 parallel with the direction of movement of the carriage 72 and through the image window 32*b* onto the surface 16*b* of the drum 18*b*. When the carriage 72 is in its first position the first mirror 74 is spaced from the first light path in a position where it will not reflect an image to any other of the mirrors. Upon movement of the carriage 72 to its second position, however, the first mirror 74 will be positioned by the carriage 72 to intercept and reflect light received from the third mirror 78 along a light path portion 82 to the second mirror 76 fixed on the housing 14 along a light path portion 83, which second mirror will reflect the image along a path portion 84 parallel to and spaced from the light path portion 80 of the first light path so that the light will intersect the reflex lens 30*b* at the same angle to its axis and will be reflected along a light path portion 85 that is common to a portion of the path portion 81 of the first light path toward and through the image window 32*b*.

What is claimed is:

1. A variable magnification optical assembly for use in a scanning type reproduction device comprising:

a housing member having an object window and an image window fixed thereon;

a carriage member;

means mounting said members for relative linear movement between a first and a second position; and light path means for defining a first light path between said windows when said members are in their first position, and for defining a second light path between said windows when said members are in their second position; said first light path and said second light path having different magnification ratios and having a common light path portion; and light path means comprising a reflex lens fixed on said carriage member and positioned to receive and reflect light along said common light path portion in both of said positions, and a plurality of mirrors comprising a first mirror mounted on said carriage, and a second mirror mounted on said housing, said first mirror being spaced from said first light path when said members are in their first relative position, and intercepting said first light path to direct light along said second light path via said second mirror when said members are in said second position.

2. A variable magnification optical assembly as claimed in claim 1 wherein said mirrors further include a third mirror fixed on said carriage member in a position such that when said members are in their first relative position said third mirror receives light directly from said fixed object window and reflects said received light directly toward said half lens reflector, and when said members are in their second relative position said first mirror receives light directly from said fixed object window and directs said received light to said half lens reflector sequentially via said second mirror and said third mirror.

3. A variable magnification optical assembly according to claim 1 wherein said mirrors further include third and fourth mirrors fixed on said housing member such that when said members are in their first relative position, said third mirror receives light directly from said fixed object window and reflects said received light directly toward said half lens reflector, and when said members are in their second relative position said first mirror receives light directly from said fixed object window and reflects said received light to said half lens reflector sequentially via said second and fourth mirrors.

4. A variable magnification optical assembly according to claim 1 wherein said mirrors further include a third mirror fixed on said housing member in a position such that when said members are in their first relative position said third mirror receives light directly from said fixed object window and reflects said received light directly toward said half lens reflector, and when said members are in their second relative position, said first mirror receives light directly from said third mirror and directs said received light to said half lens reflector via said second mirror.

* * * * *